United States Patent Office 3,717,688
Patented Feb. 20, 1973

3,717,688
METHODS FOR PREPARING GRAFT POLYMERS AND RESIN COMPOSITIONS
Shunichi Koyanagi, Naoetsu, and Hajime Kitamura and Shigehisa Sonegawa, Ohkata, Japan, assignors to Shinetsu Chemical Company
No Drawing. Filed Nov. 16, 1970, Ser. No. 90,116
Claims priority, application Japan, Nov. 22, 1969, 44/94,103
Int. Cl. C08f 41/12, 19/08
U.S. Cl. 260—876 R          7 Claims

ABSTRACT OF THE DISCLOSURE

When from 25 to 70% by weight of a prepolymer having a viscosity of from 1 to 100 cps. at 60° C. and obtained by partially polymerizing a mixture containing as its main components styrene monomer and at least one of the monomers selected from the group consisting of methyl methacrylate and acrylonitrile, are added to from 75 to 30% by weight of an aqueous emulsion of diene rubber polymer mainly composed of conjugated diene hydrocarbon, and the mixture thus prepared is subjected to graft-polymerization, an easily processable graft polymer composition superior in impact strength and transparency is obtained. From 5 to 30 parts by weight of said graft polymer composition mixed with from 95 to 70 parts by weight of vinyl chloride resin will give a vinyl chloride resin composition superior in impact strength.

SUMMARY OF THE INVENTION

This invention relates to a method for preparing graft polymers, or more particularly a method for preparing graft polymers remarkably superior in processability and impact strength, by after-polymerizing, in an aqueous emulsion of diene rubber polymer, partially polymerized compositions obtained from styrene, methyl methacrylate and/or acrylonitrile monomers as their main component(s), and a method for preparing resin compositions having superior processability and impact strength which is characterized by mixing said graft copolymer with a vinyl chloride resin.

Acrylonitrile - butadiene - styrene resins are generally called ABS resins, and they are prepared (i) by blending styrene-butadiene copolymer and acrylonitrile-butadiene copolymer, (ii) by graft-polymerizing styrene-butadiene copolymer with styrene and acrylonitrile, or (iii) by employing both the methods (i) and (ii). The ABS resins are known not only as highly improved impact resins but also as important additives to be employed for improving the properties of vinyl chloride resins, because when they are mixed with vinyl chloride resins, the processability and impact strength of the latter are improved, without their original characteristics being impaired.

By whatever method the ABS resins may be prepared, the quantitative distribution of the components (graft polymers, copolymers and homopolymers) as well as molecular weight distribution of each component can be varied by a proper choice of the conditions under which they are prepared, so that resins having various physical properties are actually put to use. But in order to prepare resins having particular properties to meet their respective uses, kinds and ratios of the components and kinds of the polymerization additives must be carefully chosen, and there is the trouble of having to make some changes in the methods for adding the polymers and the polymerization additives, resulting in the complication of measures for carrying out polymerization. On the other hand, when ABS resins are prepared under such conditions, the transparency of the products may be deteriorated and much flow mark, due to the trace of the flow, may appear on the surface of the processed product, although the processability and the impact strength of the resins may be improved.

An object of the invention is to provide a method, free from the troubles hitherto observed, for preparing highly processable and impact-resistant graft polymers, and another object of the invention is to provide a method for preparing easily processable and improved impact vinyl chloride resin compositions by using the graft polymers thus prepared.

Thus, the present invention provides a method for preparing graft polymer compositions whose main backbone chain is of diene rubber polymer, which method is characterized by (i) partially polymerizing a mixture containing as its main components styrene monomer and at least one of the monomers selected from the group consisting of methyl methacrylate and acrylonitrile, or further adding to the partially polymerized composition a mixture of the same monomers, thereby obtaining a prepolymer having a viscosity of from 1 to 100 cps. at 60° C., (ii) adding from 25 to 70% by weight of said prepolymer to from 75 to 30% by weight of an aqueous emulsion of diene rubber polymer mainly composed of conjugated diene hydrocarbon, and subsequently (iii) graft-polymerizing the mixture.

The invention also extends to the preparation of improved impact vinyl chloride resin compositions which method is characterized by mixing from 5 to 30 parts by weight of said graft polymer compositions with from 95 to 70 parts by weight of vinyl chloride resins.

To give a more detailed description of the invention, it is based on our observations that when instead of a mixture of monomers to be graft-polymerized with diene rubber polymer is used a prepolymer whose viscosity at 60° C. is from 1 to 100 cps., and which is prepared by dissolving in a mixture of monomers the polymer obtained from a mixture of the same monomers, the fluidity and impact strength of the graft polymer will be remarkably improved; and that if the graft polymer composition thus prepared is added to an ordinary vinyl chloride resin, vinyl chloride resin composition superior in processability, impact strength and transparency, and having little flow mark will be prepared.

The reason why the fluidity of the graft polymer, having diene rubber copolymer as its main backbone chain, is greatly affected by the change in viscosity of said prepolymer which is a graft component employed in manufacturing, may be that the adsorption and absorption between (a) diene rubber polymer emulsified in the aqueous medium and (b) the component to be graft-polymerized with it depends upon the viscosity of said graft component, resulting in the change in mechanism of graft polymerization reaction.

Diene rubber polymer which constitutes the backbone chain of said graft polymer compositions is prepared by polymerizing from 100 to 50% by weight of conjugated diene hydrocarbons such as butadiene, chloroprene and isoprene and from 0 to 50% by weight of unsaturated monomers copolymerizable with said conjugated diene hydrocarbons such as styrene, acrylonitrile, methyl methacrylate, isobutylene, vinyl cyanide, acrylic acid esters and α-olefine. In order to attain the object of the invention, it is preferably to use rubber polymers consisting of from 0 to 30% by weight of styrene and from 100 to 70% by weight of butadiene.

On the other hand, prepolymers to be graft polymerized with said rubber polymers have to be prepared by partially polymerizing a mixture of styrene, methyl methacrylate and/or acrylonitrile, or a mixture consisting of at least 90% of said mixture and at most 10% of one or more members of unsaturated dibasic acids or their esters exemplified by itaconic acid, fumaric acid, maleic acid, dimethyl itaconate and the like. If the total amount of styrene and methyl methacrylate and/or acrylonitrile is under 90% of the total amount of the monomers, it would be difficult to improve both processability and physical properties of the products, e.g., coloring, transparency and fluidity. It is preferable that the mixtures would contain from 20 to 80% by weight of styrene and from 80 to 20% by weight of methyl methacrylate and/or acrylonitrile, because if the amount of styrene is over 80%, the resins may be colored pale purple, and if it is under 20%, their transparency may be impaired. When the amount of methyl methacrylate and/or acrylonitrile is over 80%, the production cost may become high, but if it is under 20%, the resins may not be compatible with vinyl chloride resins, failing to give improved impact vinyl chloride resin compositions.

The prepolymers are prepared by subjecting the above-given mixture of monomers to such known reactions as emulsion polymerization, suspension polymerization or bulk polymerization; of which bulk polymerization is most preferable. To carry it out, said mixture of monomers is partially polymerized at 60–80° C., while it is stirred in the atmosphere of nitrogen in the presence of known polymerization catalysts such as benzoyl peroxide or azobisvaleronitriles, and if necessary dropping chain-transfer agents such as mercaptane having long-chained alkyl groups, chlorinated paraffin or organic solvents exemplified by heptane, hexane or chloroform. The prepolymer thus prepared is diluted with a mixture of monomers of the same composition as the occasion may require so that its viscosity may be in the range of from 1 to 100 cps. at 60° C.

According to the method of the invention, the prepolymer having a viscosity of from 1 to 100 cps. is added to an aqueous emulsion of diene rubber polymer and then graft-polymerized. The graft polymer composition thus prepared may exhibit poor impact strength if its diene rubber polymer contents is too small, but if it is too large, flow mark is apt to appear on the graft polymer composition, so that it is preferable that from 25 to 75% by weight of diene graft polymer and from 75 to 30% by weight of prepolymer are reacted.

The graft polymerization is carried out at 40 to 80° C. for 4 to 10 hours in the presence of a redox catalyst consisting of from 0.1 to 2% by weight of peroxide such as cumenehydroperoxide or benzoyl peroxides, and from 0.1 to 3% by weight of water-soluble reducing agent such as ferrous sulfate or sodium formaldehyde sulfoxylate (all percentages being based on the amount of the prepolymer), and if necessary, with an addition of known chain transfer agents and emulsifiers. If such components as diene rubber polymer, prepolymer and catalysts are added at the same time, or diene rubber polymer is dropped into the mixture of prepolymer and catalysts, the impact strength and processability of the graft polymer may be reduced, so that it is advisable that the mixture of the prepolymer and the catalysts is dropped into the diene rubber polymer at the constant rate so that the polymerization may be carried out under stirring. When the viscosity of the prepolymer at 60° C. is over 100 cps., no sufficient diffusion of the prepolymer into the emulsion of the diene rubber polymer will take place, and due to the agglomeration of the particles, the prepolymer will give large-sized particles of copolymer and impede the graft-reaction to be carried out and deposit the large particles on the inside walls of the reaction vessel or on the stirring rod, making it impossible to attain the object of the invention, but if it is under 1 cps., no graft composition having superior qualities will be obtained.

The graft polymer composition thus prepared possesses superior processability and its processed product will exhibit high impact strength.

Furthermore it is useful for improving the properties of vinyl chloride resins, so that if from 30 to 5 parts by weight of it is mixed with from 70 to 95 parts by weight of vinyl chloride resin, a vinyl chloride resin composition superior in transparency as well as processability and impact strength will be obtained. The vinyl chloride resin employed in it is not limited to vinyl chloride homopolymer. Any copolymer which has been prepared by copolymerizing at least 80% by weight of vinyl chloride with at most 20% by weight of copolymerizable monomer such as vinyl acetate or alkyl vinyl ethers may be used. If the degree of polymerization of the vinyl chloride homopolymer or copolymer is too high, it is hardly possible for the resin to give a rigid product free from plasticizers, but if it is too low, no product having high mechanical strength may be given, so that it is preferable that the degree of polymerization is between 400 and 1300.

The uniform mixing of vinyl chloride resin and said graft polymer composition is easily carried out by employing an ordinary apparatus used for such a purpose, e.g., a roll mill, a Banbury mixer, etc.

In the following examples, all parts are parts by weight and the physical properties of each of the products were determined as follows.

(a) Izod impact strength

A resin was kneaded on two rolls at 160° C. for 5 minutes into a sheet, which was pressed under the 200 atms. at 170° C. for 10 minutes. The sheet thus prepared was tested at 25° C. by ASTM–D–256, obtaining the value of its Izod impact strength.

(b) Flow temperature

As in the case described in (a), a sheet was prepared by kneading a resin on two rolls, and then was put in a Koka capillary flow tester equipped with a nozzle (1 mm. $\phi$ x 10 mm. L). The temperature was raised, starting from 120° C. at the rate of 6° C./min. under 200 atms. The temperature at which the amount of the flow was 2 mm.$^3$/sec. was employed to represent the flow temperature of the resin.

(c) Transparency

As in the case described in (a), a sheet was prepared by kneading a resin on two rolls, which then was pressed under 200 atms. at 170° C. for 10 minutes into a 1 mm. thick sheet. The test piece thus prepared was employed to determine the transparency of the resin in accordance with JIS K–6714, for which a haze meter was employed.

(d) Flow mark

A resin was subjected to extrusion molding by means of a 20 mm. $\phi$ extruder ($L/D$=20:cylinder temperature: 170–190° C., die temperature: 200° C., and screw revolution: 30 r.p.m.) equipped with a fish tailed die, which was 50 mm. in 0.2 mm. thick sheet thus prepared was employed for determining by the observation of its surface the relative amount of flow mark. The results were given in 5 degrees, No. 5 denoting the smallest amount of flow mark, and No. 1 the largest. It is preferable that a resin has a flow mark of No. 3 or above.

(e) Du Pont-type impact strength 10 test pieces, each in the size of 3 cm. square, were cut from an extruded sheet, and by means of a Du Pont-type drop impact tester, the impact strength of the test pieces was determined under the conditions as follows. Temp. 25° C., weight: 1 kg., height; 50 cm., mandrel: 12.5 mm. $\phi$, center hole of pedestal: 13.5 mm. $\phi$. The results are given by the number, in percentage, of test pieces that remained unbroken.

EXAMPLE 1

(A) Preparation of diene rubber polymer latex

| | Parts |
|---|---|
| Water | 200 |
| Potassium oleate | 1.0 |
| Disproportionated potassium rosinate | 4.5 |
| n-Dodecyl mercaptane | 0.3 |
| Potassium persulfate | 0.5 |
| Sodium pyrophosphate | 0.3 |
| Sodium hydroxide | 0.05 |

The above ingredients were put in a polymerization vessel, and after the atmosphere was replaced by nitrogen, they were stirred for 10 minutes. To the mixture thus prepared were added the monomers given in Table 1, and polymerized at 50° C. for 24 hours, obtaining latices, R-1—R-7.

TABLE 1.—PREPARATION OF RUBBER LATICES

| Sample number | Present invention | | | Control, R-4 | Present invention | | |
|---|---|---|---|---|---|---|---|
| | R-1 | R-2 | R-3 | | R-5 | R-6 | R-7 |
| Butadiene (part) | 100 | 85 | 70 | 45 | 85 | 85 | |
| Isoprene (part) | | | | | | | 85 |
| Styrene (part) | 0 | 15 | 30 | 55 | | | 15 |
| Acrylonitrile (part) | | | | | 15 | | |
| Methyl methacrylate (part) | | | | | | 15 | |
| Yield (percent) | 97 | 95 | 96 | 97 | 91 | 90 | 86 |

(B) Preparation of prepolymer

In a polymerization vessel equipped with a stirrer and a condenser were put the monomers given in Table 2, and in a nitrogen current, they were subjected to bulk polymerization at 60° C., while 0.2 part of dibenzoyl peroxide, 5 parts of n-hexane and 0.1 part of n-dodecyl mercaptane were continuously dropped into the vessel. After the lapse of time given in Table 2, the partially polymerized composition thus prepared was quenched by being diluted with a mixture of the same monomers cooled at 10° C., so that the total volume may be doubled, obtaining a prepolymer (P-1—P-10). Prepolymer (P-7') was one which was not diluted with a mixture of monomers atfer it had been partially polymerized.

(C) Preparation of graft polymers

In a polymerization vessel similar to the one employed in the preparation of the above-given prepolymer were put a rubber latex (prepared as described in (A)) and other ingredients given below, and while they were being stirred in nitrogen atmosphere, a 20% aqueous solution of sodium formaldehyde sulfoxylate was added to them, and the mixture thus prepared was subjected to preparatory mixing at 60° C. for 30 minutes, and to it was added, taking 6 hours, another mixture consisting of prepolymer, n-dodecyl mercaptane and cumene hydroperoxide, and subsequently the temperature was raised to 80° C., at which the polymerization was resumed for two more hours.

Recipe (as solid matter for all the ingredients):

| | |
|---|---|
| Rubber latex | 100 parts. |
| Prepolymer | (Cf. Table 3). |
| Sodium formaldehyde sulfoxylate | 0.003×parts of prepolymer. |
| n-Dodecyl mercaptane | 0.001×parts of prepolymer. |
| Cumene hydroperoxide | 0.006×parts of prepolymer. |

A slurry of graft polymer thus prepared was salted out in a 2% aqueous solution of calcium chloride heated at 80° C. and being stirred, filtered by an ordinary method, washed with water and dried at 70° C. for 10 hours, obtaining a graft polymer at the yield of 97% or more.

(D) Testing results

The physical properties of the product are given in Tables 3-1—3-4. As shown in the tables, the fluidity and flow mark of the graft polymers prepared by the method of the invention were much affected by their diene rubber contents and the viscosity of the prepolymer employed in their production. Although there was no great change in the impact strength, the fluidity and flow mark were remarkably improved, and the polymer, constituting the main backbone chain, and the ratio of monomers to be grafted proved to have less effect on their properties than the viscosity of the prepolymer.

TABLE 2.—PREPARATION OF PREPOLYMERS

| | Present invention | | | | | | | | | Control | |
|---|---|---|---|---|---|---|---|---|---|---|---|
| | P-1 | P-2 | P-3 | P-4 | P-5 | P-6 | P-7 | P-7' | P-8 | P-9 | P-10 |
| Monomers: | | | | | | | | | | | |
| Styrene (part) | 50 | 50 | 50 | 20 | 80 | 80 | 50 | 50 | 50 | 100 | 43 |
| Methyl methacrylate (part) | 40 | 47 | 45 | 80 | 20 | | 50 | 50 | 50 | | 43 |
| Acrylonitrile (part) | 9 | | 5 | | | 20 | | | | | |
| Dimethyl itaconate (part) | 1 | 3 | | | | | | | | | 14 |
| Polymerization time (min.) | 28 | 30 | 32 | 26 | 29 | 30 | 30 | 20 | 45 | 24 | 38 |
| Viscosity of prepolymer after it was diluted into double the amount and monomer concentration thereof: | | | | | | | | | | | |
| Viscosity (60° C., cps.) | 53 | 48 | 51 | 46 | 50 | 50 | 45 | (70) | 126 | 75 | 44 |
| Monomer concentration (percent by weight) | 93.5 | 94 | 94 | 95 | 94.5 | 95.5 | 93 | (91) | 88.5 | 91.5 | 97 |

TABLE 3-1.—PHYSICAL PROPERTIES OF GRAFT POLYMERS

[Influence of the kinds of rubber latices on them]

| Test Number | Rubber latex (kind) | Prepolymer | | Physical properties | | | |
|---|---|---|---|---|---|---|---|
| | | Kind | Part | Izod impact strength (kg.-cm./cm.$^2$) | Flow temp. (° C.) | Transparency (percent) | Flow mark |
| P.I.[1] | G-1 | R-1 | P-1 | 150 | 65 | 168 | 85 | 4 |
| P.I. | G-2 | R-2 | P-7 | 150 | 59 | 168 | 87 | 4 |
| P.I. | G-3 | R-3 | P-7 | 150 | 63 | 163 | 88 | 5 |
| Control | G-4 | R-4 | P-7 | 150 | 37 | 185 | 89 | 2 |
| P.I. | G-5 | R-5 | P-7 | 150 | 57 | 173 | [2] 86 | 4 |
| P.I. | G-6 | R-6 | P-7 | 150 | 56 | 170 | 78 | 4 |
| P.I. | G-7 | R-6 | P-2 | 150 | 57 | 169 | 82 | 4 |
| P.I. | G-8 | R-6 | P-3 | 150 | 55 | 167 | 79 | 4 |
| Control | G-9 [3] | R-6 | (P-3) | 150 | 40 | 188 | 80 | 2 |
| P.I. | G-10 | R-7 | P-7 | 150 | 52 | 166 | 83 | 4 |

[1] P.I. stands for present invention.
[2] Pale red.
[3] In G-9, a mixture (0.63 cps.) of the same monomers as those in P-3, but not at all partially polymerized, was employed.

TABLE 3-2.—PHYSICAL PROPERTIES OF GRAFT POLYMERS

[Influence of the kinds of prepolymers on them]

| | Test Number | Rubber latex (kind) | Prepolymer Kind | Prepolymer Part | Izod impact strength (kg.-cm./cm.$^2$) | Flow temp. (° C.) | Transparency (percent) | Flow mark |
|---|---|---|---|---|---|---|---|---|
| P.I | 11 | R-3 | P-1 | 150 | 61 | 166 | 84 | 4 |
| P.I | 12 | R-3 | P-2 | 150 | 59 | 165 | 85 | 4 |
| P.I | 13 | R-3 | P-3 | 150 | 63 | 170 | 85 | 4 |
| P.I | 14 | R-3 | P-4 | 150 | 57 | 171 | 88 | 4 |
| P.I | 15 | R-3 | P-5 | 150 | 60 | 167 | [1] 80 | 4 |
| P.I | 16 | R-3 | P-6 | 150 | 64 | 169 | [2] 83 | 4 |
| P.I | 17 | R-3 | P-7 | 150 | 63 | 163 | 88 | 5 |
| Control | 18 | R-3 | P-9 | 150 | 36 | 166 | 64 | 2 |
| Control | 19 | R-3 | P-10 | 150 | 25 | 178 | 81 | 2 |
| P.I | 20 | R-3 | P-7' | 150 | 64 | 155 | 83 | 5 |

[1] Pale purple.
[2] Pale red.

TABLE 3-3.—PHYSICAL PROPERTIES OF GRAFT POLYMERS

[Influence of the viscosities of prepolymers on them]

| | Test Number | Rubber latex (kind) | Prepolymer[1] Dilution rate | Prepolymer[1] Viscosity (cps.) | Part | Izod impact strength (kg.-cm./cm.$^2$) | Flow temp. (° C.) | Transparency (percent) | Flow mark |
|---|---|---|---|---|---|---|---|---|---|
| Control | G-21 | R-3 | 0 | 126 | 150 | 32 | 138 | 73 | 2 |
| P.I | G-22 | R-3 | 1.10 | 81 | 150 | 52 | 151 | 82 | 4 |
| P.I | G-23 | R-3 | 1.15 | 73 | 150 | 64 | 154 | 82 | 5 |
| P.I | G-24 | R-3 | 1.2 | 54 | 150 | 64 | 154 | 86 | 5 |
| P.I | G-25 | R-3 | 1.4 | 26 | 150 | 63 | 158 | 78 | 5 |
| P.I | G-26 | R-3 | 2.0 | 8.8 | 150 | 65 | 169 | 85 | 5 |
| R.I | G-27 | R-3 | 3.0 | 3.2 | 150 | 62 | 180 | 88 | 5 |
| P.I | G-28 | R-3 | 4.0 | 1.1 | 150 | ([2]) | 183 | 88 | 4 |
| Control | G-29 [3] | R-3 | | 0.61 | 150 | 63 | 203 | 86 | 3 |
| P.I | G-30 | R-5 | 1.15 | 73 | 150 | 61 | 158 | [4] 85 | 5 |
| P.I | G-31 | R-5 | 1.4 | 26 | 150 | 63 | 166 | [4] 83 | 4 |
| P.I | G-32 | R-5 | 3.0 | 3.2 | 150 | 62 | 180 | [4] 84 | 4 |
| P.I | G-33 | R-6 | 1.15 | 73 | 150 | 63 | 157 | 79 | 5 |
| P.I | G-34 | R-6 | 1.4 | 26 | 150 | 63 | 169 | 80 | 4 |
| P.I | G-35 | R-6 | 3.0 | 3.2 | 150 | 62 | 182 | 78 | 4 |

[1] Prepolymer P-8 was diluted with a mixture of the same monomers as employed in the preparation of P-8.
[2] Not broken.
[2] Not broken.
[3] In G-29, a mixture of the same monomers as those in P-8, but not at all partially polymerized, was employed.
[4] Pale red.

TABLE 3-4.—PHYSICAL PROPERTIES OF GRAFT POLYMERS

[Influence of the amounts of prepolymers employed]

| | Test Number | Rubber latex (kind) | Prepolymer Kind | Prepolymer Part | Izod impact strength (kg.-cm./cm.$^2$) | Flow temp. (° C.) | Transparency (percent) | Flow mark |
|---|---|---|---|---|---|---|---|---|
| Control | G-36 | R-3 | P-7 | 400 | 8.2 | 159 | 87 | 5 |
| P.I | G-37 | R-3 | P-7 | 200 | 43 | 163 | 86 | 5 |
| P.I | G-38 | R-3 | P-7 | 150 | 63 | 163 | 88 | 5 |
| P.I | G-39 | R-3 | P-7 | 100 | ([1]) | 165 | 76 | 3 |
| Control | G-40 | R-3 | P-7 | 30 | ([1]) | 163 | 43 | 1 |
| Do | G-41 | R-3 | P-4 | 500 | 5.2 | 189 | 92 | 5 |
| P.I | G-42 | R-3 | P-4 | 400 | 40 | 170 | 90 | 5 |
| P.I | G-43 | R-3 | P-4 | 150 | 57 | 171 | 88 | 4 |
| P.I | G-44 | R-3 | P-4 | 100 | ([1]) | 167 | 81 | 4 |
| Control | G-45 | R-3 | P-4 | 30 | ([1]) | 175 | 46 | 1 |
| Do | G-46 | R-3 | P-5 | 400 | 13 | 166 | 88 | 5 |
| P.I | G-47 | R-3 | P-5 | 150 | 60 | 167 | 80 | 4 |
| P.I | G-48 | R-3 | P-5 | 100 | ([1]) | 170 | 78 | 4 |
| Control | G-49 | R-3 | P-5 | 30 | ([1]) | 174 | 46 | 1 |

[1] Not broken.

EXAMPLE 2

100 parts of vinyl chloride resin given in Table 4, 1 part of dibutyltin laurate, 2 parts of dibutyltin maleate, 1 part of butyl stearate, 0.5 part of calcium stearate, and graft polymer, prepared in Example 1, in an amount given in Table 4, where well mixed in a vessel and ripened in a draft drier at 80° C. for 30 minutes. This mixture was extruded by means of the same extruder as described in (d), into a 0.5 mm. thick sheet, and was employed for determining the flow temperature, Du Pont-type impact strength and flow mark of the mixed resin. These physical properties are given in Table 5. The figures in brackets show the values of the impact strengths of vinyl chloride resins before graft polymers prepared by the method of the present invention were blended with them.

TABLE 4.—RECIPEES OF MIXED RESINS

| | Vinyl chloride resin | | | Graft copolymer | | |
|---|---|---|---|---|---|---|
| Number | Average degree of polymerization | Flow temp. (° C.) | Composition | Number | Flow temp. (° C.) | Part |
| C-1 | 440 | 151 | Straight | G-24 | 154 | 10 |
| C-2 | 720 | 178 | ...do... | G-27 | 180 | 10 |
| C-3 | 1,070 | 189 | ...do... | G-26 | 169 | 10 |
| C-4 | 1,070 | 189 | ...do... | G-27 | 180 | 10 |
| C-5 | 1,070 | 189 | ...do... | G-28 | 183 | 10 |
| C-6 | 1,070 | 189 | ...do... | G-29 | 203 | 10 |
| C-7 | 1,070 | 189 | ...do... | G-27 | 180 | 3 |
| C-8 | 1,070 | 189 | ...do... | G-27 | 180 | 5 |
| C-9 | 1,070 | 189 | ...do... | G-27 | 180 | 15 |
| C-10 | 1,070 | 189 | ...do... | G-27 | 180 | 20 |
| C-11 | 1,070 | 189 | ...do... | G-27 | 180 | 30 |
| C-12 | 1,070 | 189 | ...do... | G-27 | 180 | 50 |
| C-13 | 780 | 173 | Containing 5% of vinyl acetate. | G-26 | 169 | 10 |
| C-14 | 1,420 | 198 | Straight | G-27 | 180 | 10 |
| C-15 | 1,530 | 206 | ...do... | G-27 | 180 | 10 |
| C-16 | 440 | 151 | ...do... | G-20 | 155 | 10 |
| C-17 | 720 | 178 | ...do... | G-10 | 166 | 10 |

TABLE 5.—PHYSICAL PROPERTIES OF MIXED RESINS

| Number | Flow temperature (° C.) | Du Pont-type impact strength (percent) | Flow mark | Transparency (percent) |
|---|---|---|---|---|
| C-1 | 153 | 40 (0) | 5 | 90 |
| C-2 | 178 | 80 (20) | 5 | 91 |
| C-3 | 174 | 90 (30) | 4 | 88 |
| C-4 | 186 | 90 (30) | 5 | 88 |
| C-5 | 188 | 100 (30) | 5 | 90 |
| C-6 | 189 | 80 (30) | 3 | 87 |
| C-7 | 188 | 40 (30) | 4 | 91 |
| C-8 | 187 | 80 (30) | 5 | 90 |
| C-9 | 184 | 100 (30) | 5 | 91 |
| C-10 | 183 | 100 (30) | 5 | 90 |
| C-11 | 181 | 100 (30) | 5 | 90 |
| C-12 | 181 | 100 (30) | 2 | 88 |
| C-13 | 170 | 50 (10) | 5 | 90 |
| C-14 | 192 | 70 (30) | 3 | 74 |
| C-15 | 197 | 60 (30) | 2 | 62 |
| C-16 | 153 | 40 (0) | 5 | 89 |
| C-17 | 170 | 70 (20) | 5 | 90 |

What is claimed is:

1. A method for preparing a vinyl chloride resin composition having improved impact strength comprising the steps of subjecting to bulk polymerization a mixture of from 20 to 80% by weight of styrene and from 80 to 20% by weight of at least one monomer selected from the group consisting of methyl methacrylate and acrylonitrile, to produce a prepolymer having a viscosity of from 1 to 100 cps. at 60° C.; adding from 25 to 70% by weight of said prepolymer, based on the total amount of the composition, to from 75 to 30% by weight of an aqueous emulsion of diene rubber polymer, prepared by copolymerizing from 100 to 70% by weight of butadiene with from 0 to 30% by weight of styrene, to produce a polymerization mixture; then graft-polymerizing the polymerization mixture in the presence of a redox catalyst to produce a graft polymer; and mixing from 5 to 30 parts by weight of the graft polymer with 95 to 70 parts by weight of vinyl chloride resin.

2. The method as claimed in claim 1, in which said prepolymer is prepared by partially polymerizing at least 90% by weight of a mixture of from 20 to 80% by weight of styrene and from 80 to 20% of said one monomer with at most 10% by weight of a copolymerizable unsaturated monomer selected from the group consisting of itaconic acid, fumaric acid, maleic acid, and dimethyl itaconate.

3. The method as claimed in claim 1, in which a mixture of the same monomers from which the prepolymer was prepared is added to the prepolymer in an amount sufficient to adjust the prepolymer's viscosity to within said viscosity range.

4. The method as claimed in claim 1, in which the vinyl chloride resin is selected from the group consisting of vinyl chloride homopolymer and a copolymer comprising at least 80% by weight of vinyl chloride and at most 20% by weight of another copolymerizable vinyl monomer.

5. The method as claimed in claim 4, in which said another copolymerizable vinyl monomer is vinyl acetate or an alkyl vinyl ether.

6. The method as claimed in claim 4, in which said homopolymer and copolymer of vinyl chloride and vinyl monomer have a degree of polymerization of 400–1300.

7. A vinyl resin composition having improved impact strength and flow mark prepared by the process of claim 1.

References Cited

UNITED STATES PATENTS

| 3,488,743 | 1/1970 | Baer et al. | 260—876 |
| 3,373,227 | 3/1968 | Finestone et al. | 260—880 |

FOREIGN PATENTS

| 854,238 | 11/1960 | Great Britain | 260—880 |
| 16,307 | 9/1966 | Japan | 260—876 |

JOHN C. BLEUTGE, Primary Examiner

U.S. Cl. X.R.

260—23.7 H, 880 R, 887, 890